United States Patent [19]

Rymal, Jr.

[11] Patent Number: 4,597,863
[45] Date of Patent: * Jul. 1, 1986

[54] HYDROCARBON RECOVERY SYSTEM

[75] Inventor: Theodore R. Rymal, Jr., Dickinson, Tex.

[73] Assignee: Robert Dow, a part interest

[*] Notice: The portion of the term of this patent subsequent to Jan. 8, 2002 has been disclaimed.

[21] Appl. No.: 594,280

[22] Filed: Mar. 28, 1984

Related U.S. Application Data

[63] Continuation of Ser. No. 308,932, Oct. 5, 1981, abandoned.

[51] Int. Cl.$^4$ .................. E02B 15/04; B01D 17/02
[52] U.S. Cl. .................. 210/117; 210/242.3; 210/521; 210/923
[58] Field of Search ........... 210/117, 119, 136, 242.3, 210/521, 522, 923; 137/172

[56] References Cited

U.S. PATENT DOCUMENTS

| | | | |
|---|---|---|---|
| Re. 30,729 | 9/1981 | Farrell et al. | 210/801 |
| 2,948,677 | 8/1960 | Austin et al. | 210/608 |
| 3,237,774 | 3/1966 | Schuback | 210/242.3 |
| 3,376,977 | 4/1968 | Gordon et al. | 210/117 |
| 3,495,561 | 2/1970 | Trapp | 210/242.3 |
| 3,656,624 | 4/1972 | Walton | 210/242.3 |
| 3,661,263 | 5/1972 | Peterson et al. | 210/242.3 |
| 3,662,891 | 5/1972 | Headrick | 210/242.3 |
| 3,662,892 | 5/1972 | Sorensen | 210/242.3 |
| 3,663,149 | 5/1972 | Heagler | 431/2 |
| 3,664,505 | 5/1972 | Brittingham | 210/242.3 |
| 3,666,099 | 5/1972 | Galicia | 210/242.3 |
| 3,690,464 | 9/1972 | Heinicke | 210/242.3 |
| 3,700,107 | 10/1972 | Flaviani | 210/242.3 |
| 3,708,070 | 1/1973 | Bell | 210/242.3 |
| 3,722,688 | 3/1973 | Wirsching | 210/242.3 |
| 3,726,406 | 4/1973 | Damberger | 210/242.3 |
| 3,731,813 | 5/1973 | Tipton | 210/242.3 |
| 3,737,040 | 6/1973 | Bryday et al. | 210/206 |
| 3,748,264 | 7/1973 | McCombie | 210/242.3 |
| 3,762,556 | 10/1973 | Penton | 210/242.3 |
| 3,762,558 | 10/1973 | Anderson | 210/242.3 |
| 3,771,662 | 11/1973 | Muramatsu et al. | 210/242.3 |
| 3,810,547 | 5/1974 | Shudo | 210/242.3 |
| 3,823,828 | 7/1974 | Derzhavets et al. | 210/242.3 |
| 3,833,122 | 9/1974 | Cook | 210/207 |
| 3,850,807 | 11/1974 | Jones | 210/170 |
| 3,907,685 | 9/1975 | Aramaki et al. | 210/242.3 |
| 3,923,649 | 12/1975 | Sparham et al. | 210/242.3 |
| 3,966,613 | 6/1976 | Kirk et al. | 210/242.3 |
| 3,988,241 | 10/1976 | Rafael | 210/208 |
| 4,010,103 | 3/1977 | Morgan et al. | 210/242.1 |
| 4,014,795 | 3/1977 | In'tveld | 210/242.1 |
| 4,042,512 | 8/1977 | McCarthy et al. | 210/519 |
| 4,046,693 | 9/1977 | Glover | 210/256 |
| 4,056,472 | 11/1977 | Teasdale | 210/242.3 |
| 4,104,164 | 8/1978 | Chelton | 210/136 |
| 4,119,541 | 10/1978 | Makaya | 210/242.3 |
| 4,151,081 | 4/1979 | Bolli et al. | 210/242.3 |
| 4,257,889 | 3/1981 | Wöder et al. | 210/104 |
| 4,305,819 | 12/1981 | Kobozev et al. | 210/242.1 |
| 4,436,630 | 3/1984 | Anderson | 210/119 |
| 4,492,630 | 1/1985 | Rymal, Jr. | 210/117 |

FOREIGN PATENT DOCUMENTS

| | | |
|---|---|---|
| 1072455 | 2/1980 | Canada . |
| 2201143 | 8/1972 | Fed. Rep. of Germany . |
| 2354939 | 10/1974 | Fed. Rep. of Germany . |
| 55-22574 | 2/1980 | Japan . |
| 783115 | 11/1980 | U.S.S.R. . |

Primary Examiner—Peter Hruskoci
Attorney, Agent, or Firm—David M. Ostfeld

[57] ABSTRACT

A skimming vessel is provided for collecting hydrocarbons or other floating materials, from the surface of a body of water. The floating vessel has an engine driving a prop and is provided with a skimming mode and a traveling mode. A dual skimmer system is provided for skimming the surface of a body of water for collecting hydrocarbons from the surface of the water. The surface of the water is skimmed to capture the floating hydrocarbons by drawing the water through the skimmer with the vessel drive propeller when the vessel is in its skimming mode and to block the passage of water through the skimmer when the vessel is in its travel mode, so that the vessel drive is used to improve the removal of hydrocarbons from the surface of the body of water. The vessel has a passageway or tunnel formed in the bottom thereof for the passage of water and has the prop mounted in the tunnel for drawing water through the tunnel to pull water into the skimming system. The tunnel is blocked and the position of at least one skimmer is changed to switch the vessel into a traveling mode for more rapid movement through the water. One or more tunnels can be utilized as desired in the bottom of the vessel.

19 Claims, 12 Drawing Figures

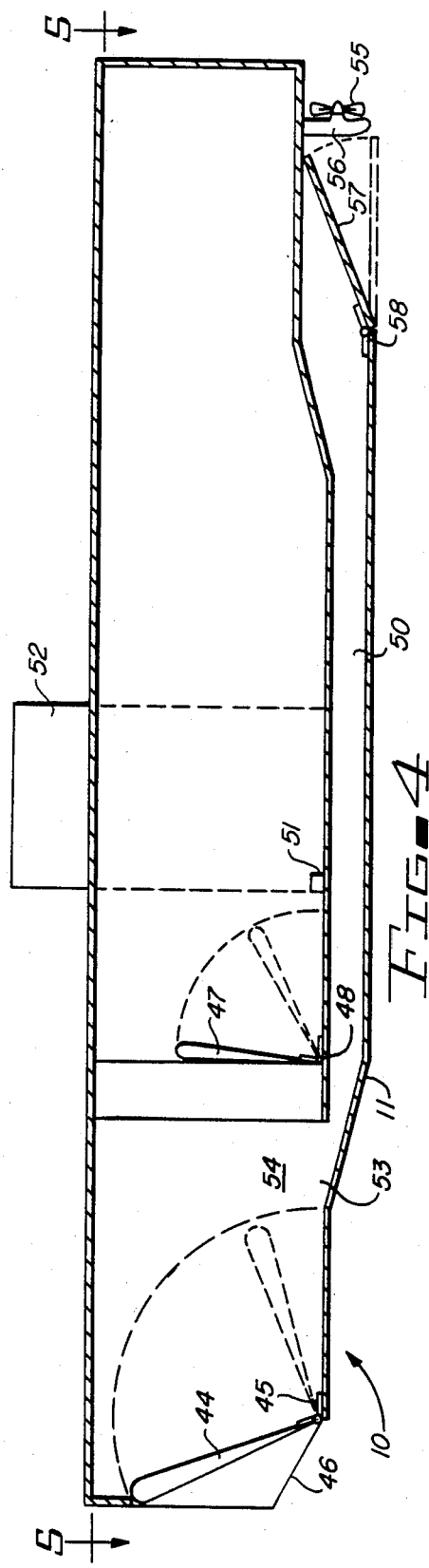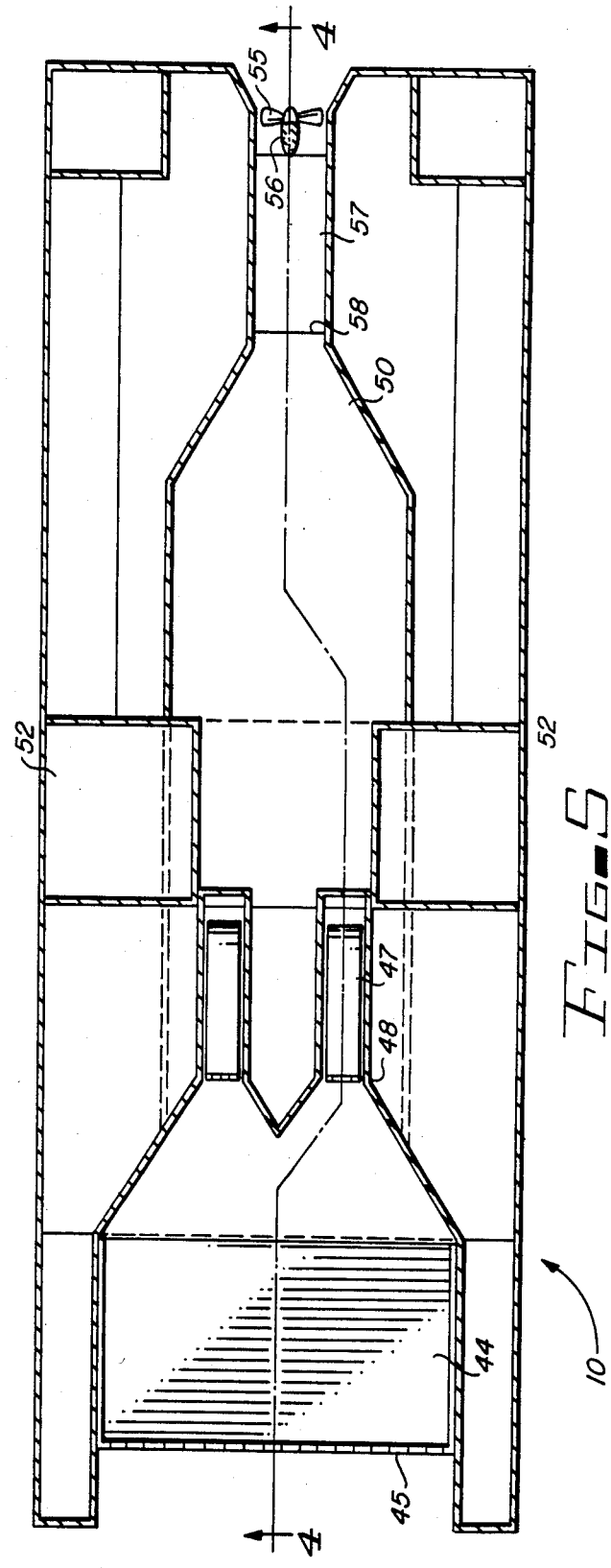

HYDROCARBON RECOVERY SYSTEM

This is a continuation of application Ser. No. 308,932, filed Oct. 5, 1981, now abandoned.

BACKGROUND OF THE INVENTION

This invention relates to a skimming vessel for skimming the surface of a body of water for collecting floating hydrocarbons and water from the surface, feeding it to an oil/water separator and separating the hydrocarbons from the water.

In the past, a wide variety of oil skimming vessels have been provided for skimming the surface of a body of water for collecting oil floating on the surface from oil spills, leaking oil wells, and the like. Boats of this type generally operate on the principle that oil having a lower density than water will float on the water and can thereby be skimmed off. A weir or skimmer is mounted to collect only the surface portion of the water, which is then collected in a tank to give the oil a chance to float to the top where it is removed and the water directed back into the body of water. Skimming vessels of this type typically work in conjunction with floating booms which are connected for directing or collecting the floating oil within the perimeter of the booms. Another common way of collecting and separating oil floating on a body of water is to use a boat having a rotating belt made out of synthetic fiber or other material specially selected for the oil to stick to and which allows the water to run through. The belt can be positioned and driven as an endless conveyor with one end protruding into the surface of the water and a squeegee arrangement located at the other end of the endless belt removes the oil collected on the belt which is then dropped into a storage container.

The present invention is for an inexpensive floating vessel operating on a skimming principle which uses the engine propellor for drawing the surface oil/water mixture into the skimming system in one mode and for traveling at a faster rate of speed in a second or traveling mode. The system also provides for a more sophisticated oil/water separator mounted on the floating vessel. Most oil/water separators allow the oil/water mixture to settle in a tank so that the oil will float to the top of the water where it is removed with a pump while the water is removed from the bottom of the tank. One prior oil/water separator adapted for land use can be seen in U.S. Pat. No. 4,042,512 to McCarthy, et al., where the oil/water mixture is directed against an angled corrugated surface and then through corrugated baffle members and uses a last-in-last out separator for the oil/water mixture.

The oil/water separator of the present invention utilizes two tanks connected by a passageway in which the oil/water mixture is fed into the first tank, passes through a pair of check valves into the passageway where a plurality of baffles are mounted in a predetermined arrangement. The oil/water mixture is then fed into the second tank where the oil can be removed from the top and water from the bottom by a simple overflow arrangement.

SUMMARY OF THE INVENTION

A skimming vessel for collecting hydrocarbons from the surface of a body of water is provided having a floating vessel with an engine and a driving prop. The vessel has a skimming mode and a traveling mode and a skimming system mounted thereon.

The skimming system skims the surface to collect the mixture of hydrocarbons and water from the surface of a body of water. When the vessel is in a skimming mode, water is drawn through the skimmers through a tunnel formed in the bottom of the vessel by the operation of the vessel propellor. When the vessel is in the traveling mode, the skimmer is repositioned to block skimming and the tunnel is blocked so that the prop drives the vessel more rapidly through the water. An oil/water separator is mounted on the vessel for separating the hydrocarbons from the water in the mixture collected by the skimmer.

An oil/water separator is provided for the vessel having a housing forming a pair of tanks connected by a passageway. The oil/water mixture inlet directs the liquid into one tank which is connected between its ends to the passageway by a pair of check valves to allow the flow of liquid into the passageway, but not from the passageway back into the first tank. The passageway has a plurality of predetermined baffles mounted therein for separating oil and water and connects to the middle of the second tank which has an oil outlet connected to the top portion of the tank and an overflow water outlet connected to the bottom portion of the tank.

BRIEF DESCRIPTION OF THE DRAWINGS

Other objects, features and advantages of the present invention will be apparent from the written description and the drawings, in which:

FIG. 4 is a sectional view taken on the line 4—4 of FIG. 5;

FIG. 5 is a sectional view taken on the line 5—5 of FIG. 4;

DESCRIPTION OF THE PREFERRED EMBODIMENT

Figure 1:
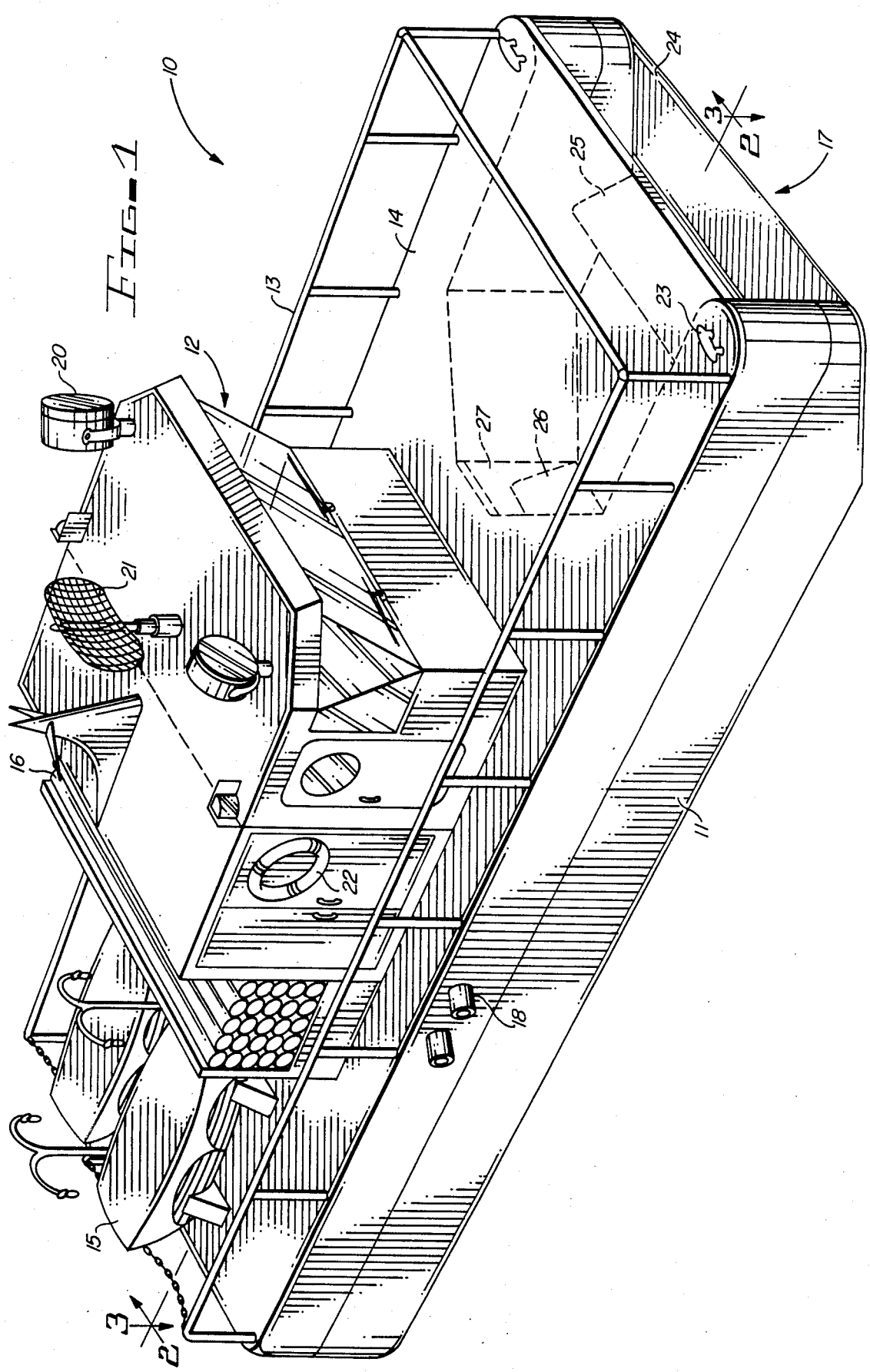
FIG. 1 is a perspective view of a skimming vessel in accordance with the present invention.

Referring to the drawings and especially to FIG. 1, a skimming vessel or boat 10 is illustrated having a hull 11, a cabin 12 and a railing 13 attached to the deck 14. A vessel 10 may provide for auxiliary dinghys 15 and the storage of floating boom sections 16 which can be utilized in connection with the skimming to direct water having oil or other floating materials thereon towards the front skimming portion 17 of the boat 10. The hull 11 can have water discharge openings 18 as well as spotlights 20, an antenna 21, life preserver 22, cleats 23, and other accessories normally found on a vessel. The skimming portion 17 which is located forward on the vessel 10 has a floor portion 24 along with a first hinged floating skimmer 25 adapted to float when in a skimming position and to ride on the hinges which are hinged to the floor 24 in a skimming mode and to be moved forward to block a portion of the forward opening in a travel mode. A second hinged floating skimmer member 26 is mounted in an opening 27 in the hull 11. In operation, the vessel 10 is adapted to draw an oil/water surface mixture over the skimmer 25 and through the opening 27 over the skimmer 26 where it is directed into an oil/water separator. The hinged, floating skimming members 25 and 26 are adapted to be in position to ride with the level of the water when in a skimming position and to be moved over for blocking the entrance of water when the vessel 10 is in a travel mode.

Figure 2:
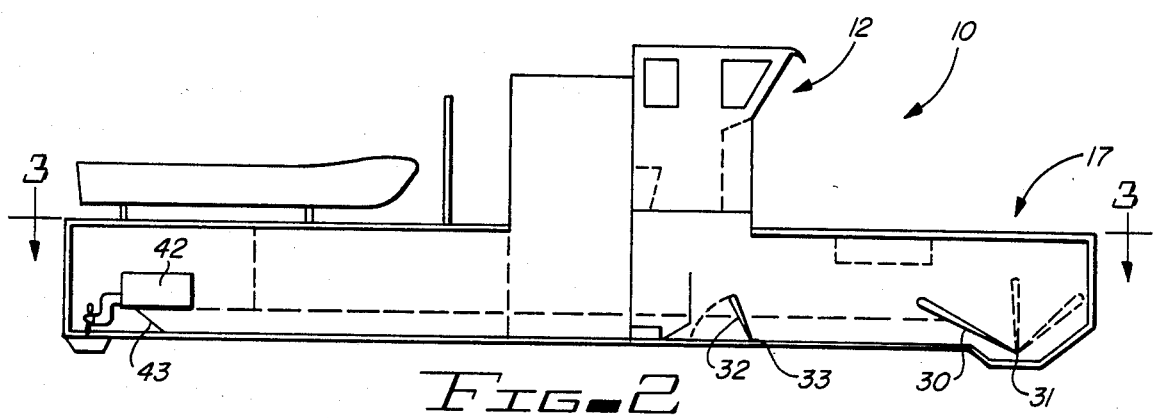
FIG. 2 is a side sectional view taken on the line 2—2 of FIG. 1.
Figure 3:
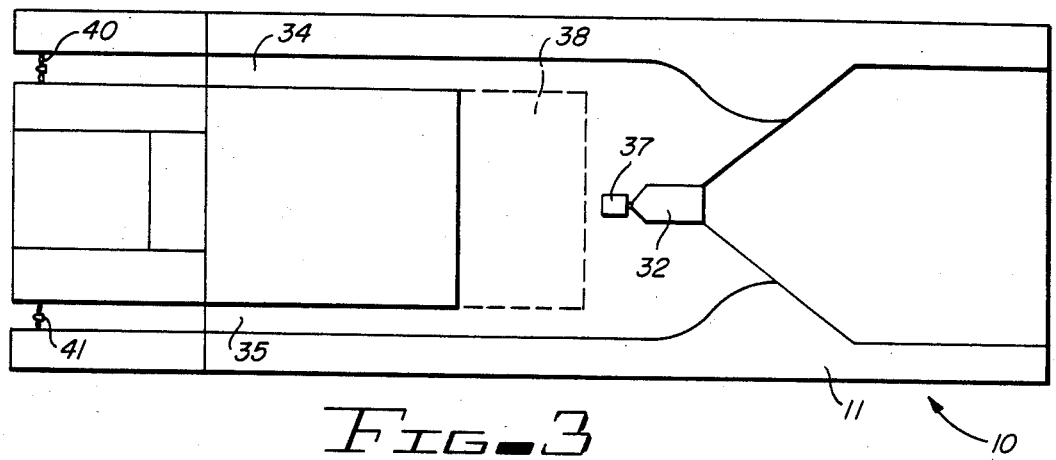
FIG. 3 is a top sectional view taken on the line 3—3 of FIG. 1.
Figure 6:
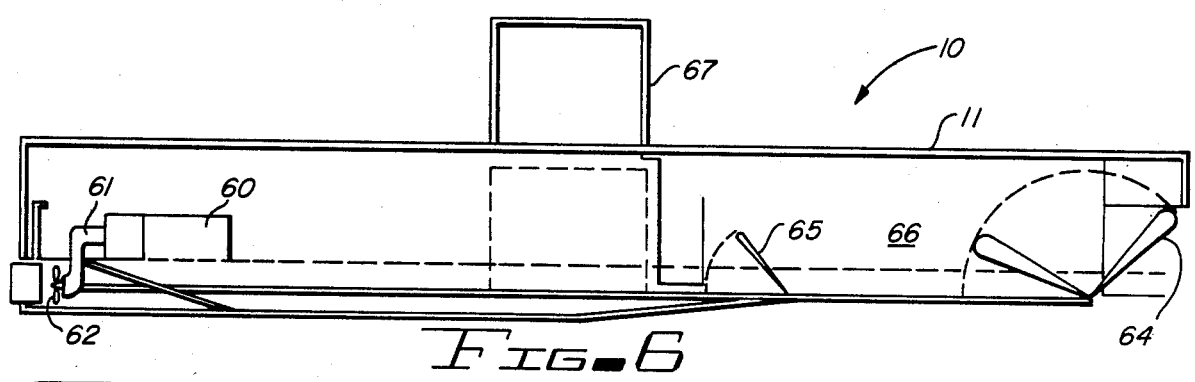
FIG. 6 is a side sectional view of an alternate embodiment of a skimming vessel.
Figure 7:
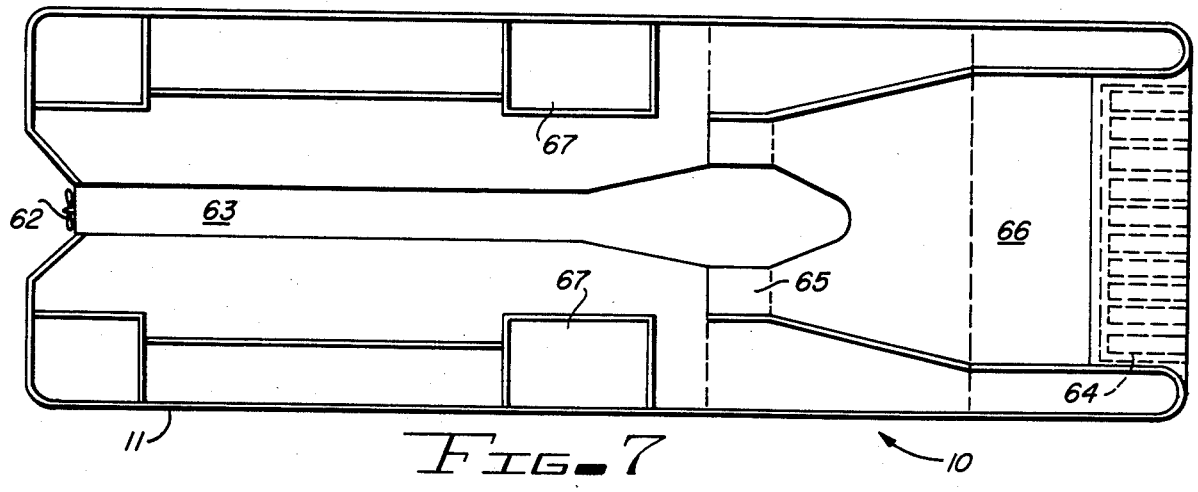
FIG. 7 is a top sectional view of the embodiment of FIG. 6.

FIGS. 2 and 3 show one embodiment of a skimmer vessel, while FIGS. 4 and 5 show a second embodiment and FIGS. 6 and 7 show yet a third embodiment of the same basic vessel. Each has the same vessel 10 having a cabin 12 and a skimmer portion 17 on the forward portion of the vessel 10. In FIGS. 2 and 3 a first skimmer member 30, corresponding to member 25 of FIG. 1, is shown in a floating position hinged with a hinge 31 and a second skimming member 32, corresponding to member 25 of FIG. 1, hinged at 33. In the embodiments of FIGS. 2 and 3, a pair of tunnels 34 and 35 are connected to the holding area. The floating skimmer, in turn, opens into a collection hole 37 from which a pump (not shown) pumps the oil/water mixture into the oil/water separator 38. The tunnels 34 and 35 are connected through and along the bottom of the hull 11 and have the propellor and prop portions 40 mounted in tunnel 34 and 41 mounted in tunnel 35. Each propellor and prop 41 is connected to a separate engine 42. The hull 11 also has a hinged gate 43 in each tunnel 34 and 35 which raise and lower simultaneously to connect the prop 40 and 41 into their respective tunnels to draw liquid through the tunnels or alternatively to block off the tunnels to draw liquid directly from the water under the bottom of the boat. When water is being pulled through the tunnels 34 and 35 from the holding area 36, it is pulled from below the water level so that the pump pumping the water through the skimmer 32 into the oil separator 38 is pulling the oil/water mixture on the upper layer into the skimmer 32 hole 37, whereas remaining collected skimmed water is being pulled from below the surface through the tunnels 34 and 35. This creates a suction drawing surface liquid past the skimmer 30 by pulling only surface water from the surrounding body of water. In contrast, skimming vessels not having the drawing action tend to create a wake and push the surface water away from the skimmer opening in front of the boat, thus substantially reducing the effectiveness of a skimming boat riding along a body of water. The present skimming vessel 12 moves slowly when in a skimming mode but draws large amounts of water directly into the front skimming portion of the vessel. However, by dropping the gate 43 and cutting off the tunnels 34 and 35 and swinging the skimming member 30 forward as shown by the dash lines and swinging the skimming member 32, the vessel 12 can be rapidly converted to a travel mode for much faster travel through the water when not skimming.

FIGS. 4 and 5 show another embodiment where the vessel 10 has a hull 11 with a floating skimming member 44 hinged with a hinge 45 and mounted to the floor 46 and shown in its travel mode in FIG. 4, with dashed lines indicating the skimming mode for the vessel 10. The second floating skimming member 47 is hinged at 48 and a single tunnel 50 is provided along the bottom of the vessel. Water passing the skimmer 47 is pulled into the opening 51 of the oil/water separator 52. In this embodiment, a pair of skimmers 47 is utilized while the tunnel 50 has an opening 53 into the holding area 54 directly beneath the skimming members 47 so that the skimmed water in the holding area 54 passes over the skimmer members 47, which are actually floating weirs, while the water pulled through the tunnel 50 comes from below the surface in the holding area 54 and is pulled through by the propellor 55 mounted to the prop 56. When the gate 57 hinged at 58 is in its raised position as shown in FIG. 4, the vessel is in its travel mode so the propellor 55 operates by drawing water surrounding the boat through the propellor 55 for moving the boat to a new location. Dual skimmers 47 each feed into a separate oil/water separator 52 in this embodiment.

FIGS. 6 and 7 shows yet another embodiment of a vessel 10 having a hull 11 driven by an engine 60 driving a prop 61 to drive a propellor 62 mounted in a single tunnel 63. A hinged floating weir 64 is mounted to the front of the vessel 10 while second floating weirs 65 are mounted to the rear of a holding area 66 and located at each side of the opening of the tunnel 63. Tunnel 63 draws the liquid from beneath holding area 66. Liquid is drawn over weirs 65 and then fed into the oil/water separators 67.

As can be seen at this point, a skimming vessel uses forward and aft weirs for double skimming the surface of the liquid in conjunction with a water tunnel having water drawn therethrough by the drive prop of the vessel while the second skimmer or skimmers takes off the floating mixture in a holding area located between the forward and aft floating weirs, and that by shifting the floating weirs and a gate to the tunnel, the vessel can quickly be converted from a skimming mode to a travel mode. In addition to the skimming, a unique oil/water separator is also provided on the vessel. The operation of the oil/water separator can be seen in conjunction with FIG. 8.

Figure 8:
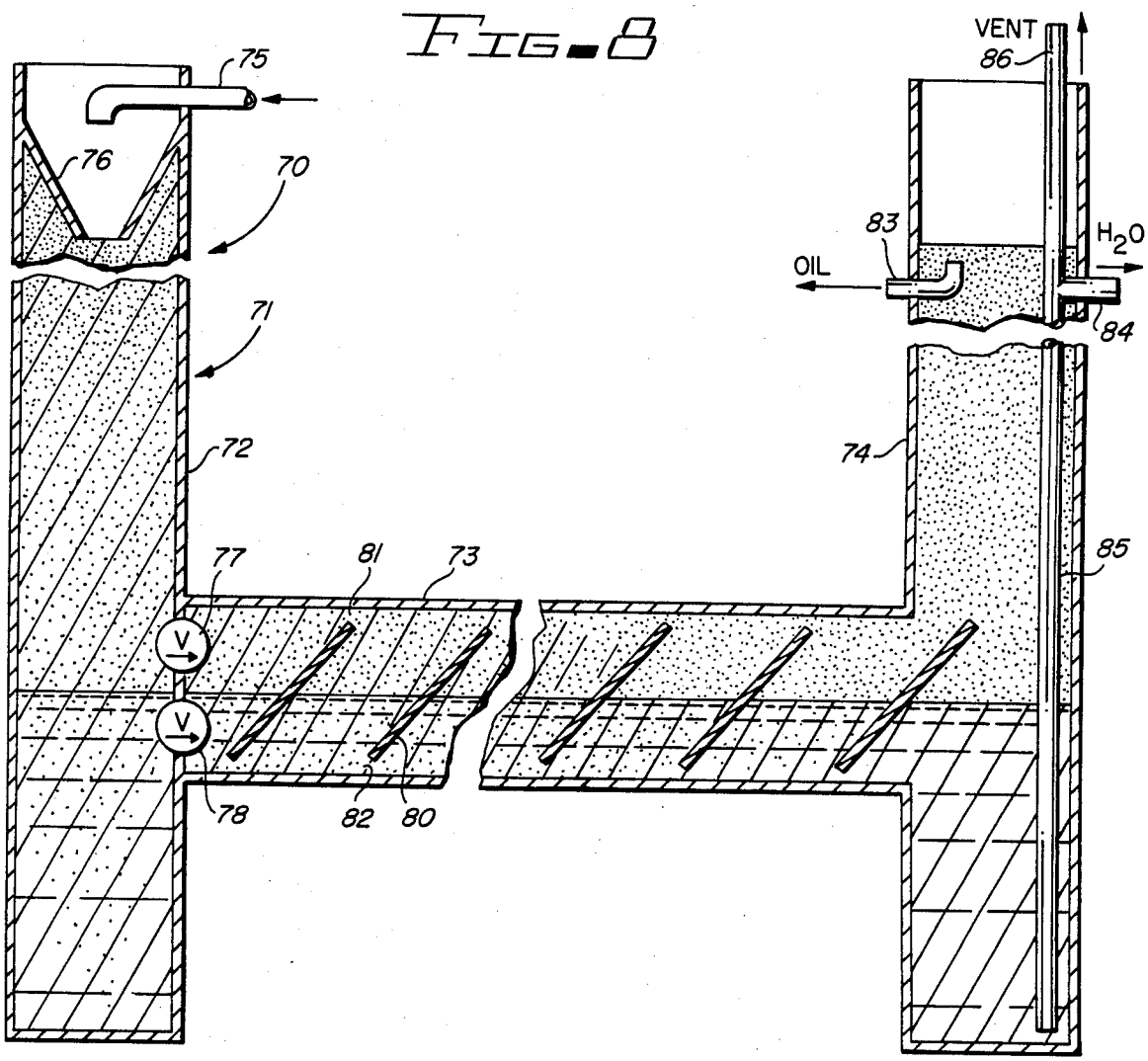
FIG. 8 is a sectional view of an oil skimming system in accordance with the present invention.

Turning to FIG. 8, an oil/water separator 70 has a housing 71 forming a first tank 72 and a passageway 73 connecting the tank 72 to a second tank 74. An oil/water inlet line 75 feeds the mixture into a funnel portion 76 at the top of tank 72. Inlet line 75 is connected to a pump (not shown) which is in fluid communication with hole 37 or the like in the other embodiments. As the oil/water mixture pours into the tank 72 it begins to separate with the oil floating to the top. Between the ends of the tank 72, a passageway 73 is connected thereby to an upper check valve 77 and a lower check valve 78 which is used to maintain the already partially separated oil and water as it proceeds through the passageway 73 and to prevent it from flowing back into the tank 72. The plurality of angled baffles 80 are mounted in the passageway 73 angled for the rising oil to float over the top area 81 of the baffles 80 while the water can pass under the baffles 80 through the passage 82. The baffles 80 need to be made of materials having oil adhesive characteristics, such as acrylic polymers. The water and oil thus proceed through a series of baffles, as shown, into the tank 74 where the oil tends to be substantially separated and rises to the upper portion of the tank 74 while the water tends to stay in the bottom of the tank 74. Along the upper part of the tank 74 is an oil outlet 83 and a water outlet 84. The water outlet is connected to an elongated water pipe 85 extending down near the bottom of the tank 74 so that when the tank fills up sufficiently for the oil to leave the outlet 83, the water will also flow out or overflow from the pipe 84. Thus, a pump is not required to remove the oil and water even though a pump is used to raise the mixture to the inlet 75. A vent pipe 86 is connected to the pipe 85 and acts as a siphon break to prevent a siphon from being generated and thereby emptying the tank 74.

Figure 9:
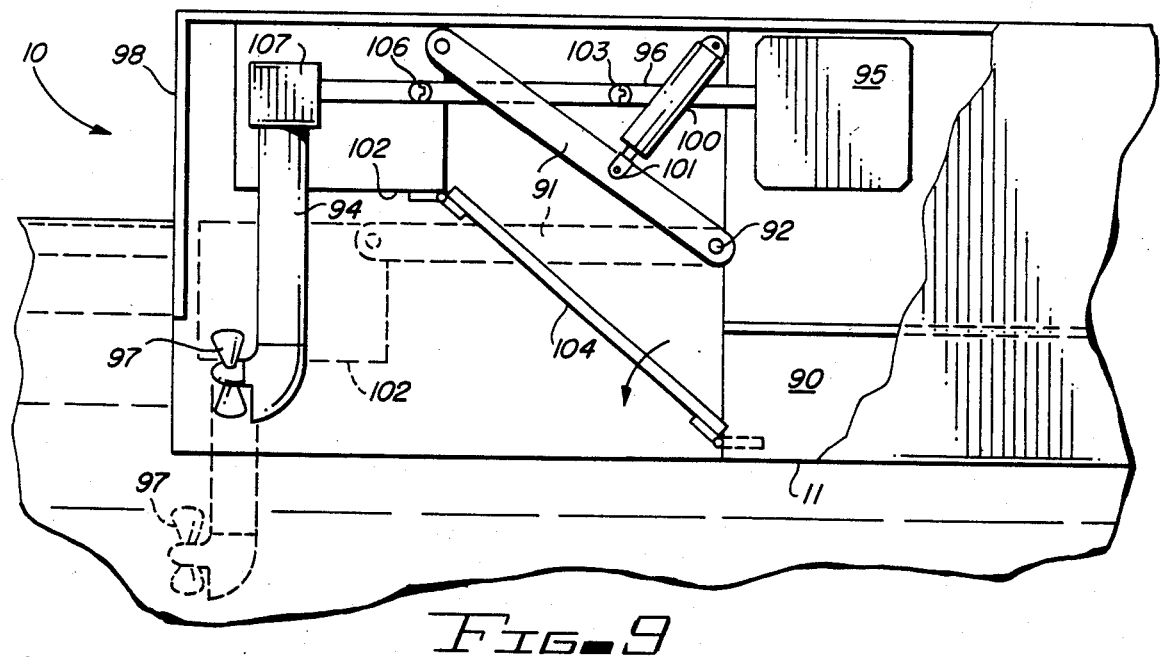
FIG. 9 is a sectional view of an alternate prop arrangement.

FIG. 9 shows an alternate embodiment of switching the vessel 10 from a travel to a skimming mode and has a hull 11 with a tunnel 90 and an arm 91 hinged at 92 to the hull and an arm 104 hinged separately to the hull. The vessel 10 has a transom 98 and a prop 94 connected to an engine 95. The prop is connected by means of drive line 96 to the engine 95 and to the propellor 97. The prop 94 is mounted in a support box 102, which box is held by linkage members 91 and 104. A hydraulic cylinder 100 is mounted to a hinged point 101 of arm 91 and thereby drops the arm 91 and the hinged box 102, as well as the prop 94 and propellor 97, blocing the tunnel 90 and lowering the propellor 97 to a more efficient position below the hull 11. The drive shaft 96 has a pair of universal joints 103 and 106 connected to the drive prop 94. The drive shaft is connected to gear box 107 and attached to the prop 94. It should, of course, be clear that the illustrated linkage members 104 and 91 and cylinder 100 are each one of a pair supporting the box 102 from both sides.

Figure 10:
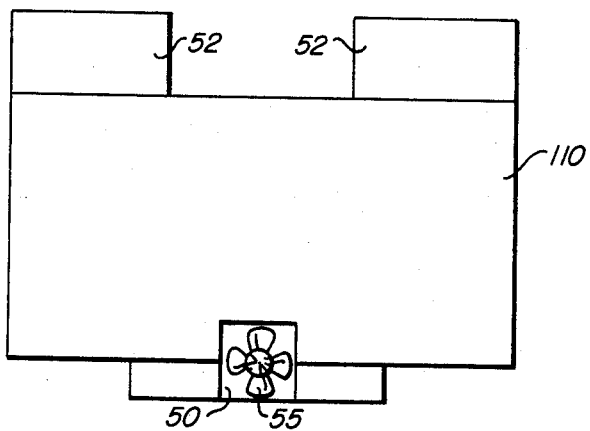
FIG. 10 is an end elevation of a skimming vessel in accordance with the embodiment of FIGS. 4 and 5.

Turning now to FIG. 10, an end view of the vessel of FIGS. 4 and 5 is illustrated having a transom 110 with the propellor 55 protruding from the tunnel 50 and having the oil/water separators 52 mounted thereover.

Figure 11:
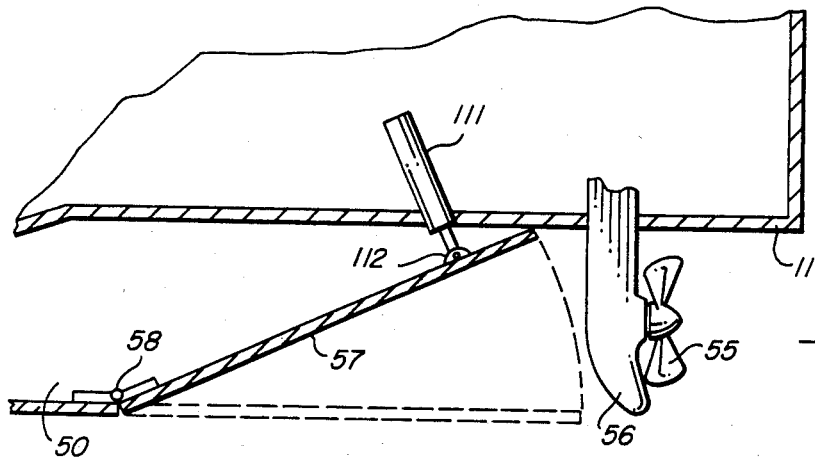
FIG. 11 is a detail of the prop arrangement of the embodiment of FIG. 4.

FIG. 11 shows the preferred embodiment for changing the prop operation from skimming to travel mode and is a detail from FIG. 4, in which the tunnel 50 is in line with the propellor 55 connected to the prop 56. A gate 57 is hinged at 58 and supported by hydraulic cylinder 111, pinned to a bracket 112 and is adapted to raise or lower the gate 57 relative to the hull 11 to open or block the tunnel and to position the propellor 55 for skimming or to block the tunnel 50 for traveling.

Figure 12:
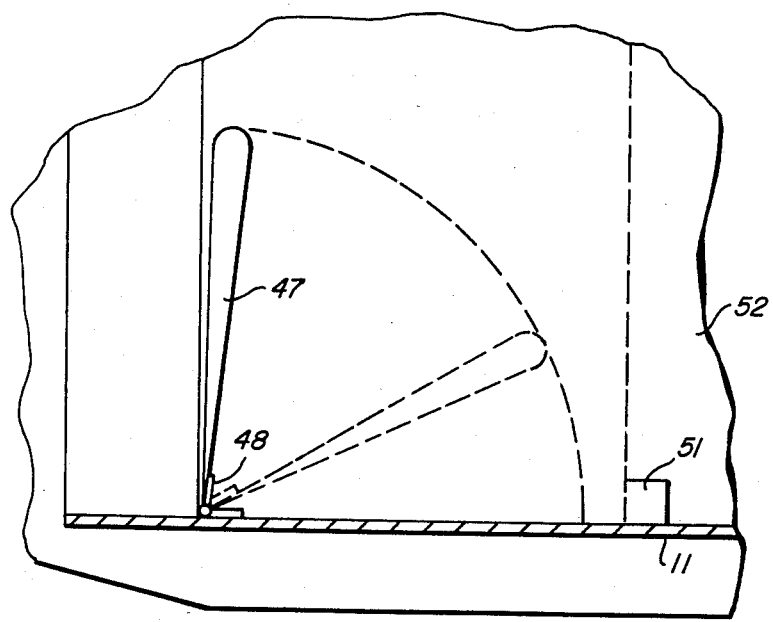
FIG. 12 is a detail of a floating skimmer in accordance with FIG. 4.

FIG. 12 shows an enlarged section taken from FIG. 4 of the floating weir 47 which may be made of a material having flotation therein which is hinged with a hinge 48 and has a travel mode position as shown in FIG. 12, and a skimming mode as shown by dashed lines. Water is skimmed over the skimming member 47 and is drawn into the opening 51 of the oil/water separator 52 mounted on the hull 11.

It should be clear at this time that a skimming vessel as well as an oil/water separator have been provided which advantageously provide an effective double skimming prior to entering the oil/water separator which provides a more effective separation of the oil and water being collected on the surface of a body of water. It will, of course, be clear that collected, separated water is dumped back into the body of water, while separated oil is temporarily stored until it can be removed from the vessel.

Accordingly, the present invention is not to be construed as limited to the forms shown, which are to be considered illustrative rather than restrictive.

I claim:

1. A skimming device for collecting hydrocarbons from the surface of a body of water, comprising:

a floating hull having a power source and a propellor connected together, said hull having boat means for operating the hull in a skimming mode;

said boat means including skimming means for skimming the surface of the water for collecting a mixture of hydrocarbons and water from the surface of the body of water, said skimming means including, when said boat means is operating in the skimming mode, at least one tunnel passing through said bottom portion of said hull and positioned for said propellor to draw water therethrough, whereby the vessel propellor is used to improve the removal of hydrocarbons from the surface of a body of water; and separating means for separating hydrocarbons from skimmed water collected by said skimming means, said separating means including a housing forming a pair of tanks connected by a passageway arranged between the top and bottom of said tanks;

an oil/water mixture inlet in one tank of said housing, check valve means between said one tank and said passageway between said tanks to prevent said oil/water mixture from flowing back to said one tank from said passageway;

a plurality of baffles mounted at an angle with a space above and below each said baffle in said passageway between said tanks to permit fluid to flow about both the upper and lower ends of said baffles and therebetween and aid in separating oil from the water;

an oil outlet from said other tank, and a water outlet from said other tank.

2. A skimming device in accordance with claim 1, in which said propellor is a driving propellor and said boat means includes means for operating the hull in a traveling mode, including to block the passage of water through said skimming means when said boat is operating in the traveling mode.

3. A skimming vessel in accordance with claim 2, in which a gate is mounted to block said tunnel in one position and to open said tunnel in the other position.

4. A skimming vessel in accordance with claim 3, in which said gate is hinged and swings upward to block said tunnel.

5. A skimming device in accordance with claim 4, in which said swinging gate is supported by at least one hydraulic cylinder which shifts said gate between a tunnel blocking position when said boat means is in the traveling mode and a tunnel open position when said boat means is in the skimming mode.

6. A skimming device in accordance with claim 2, in which said skimming means further includes at least two skimmers spaced apart from each other with a holding area in between and wherein said first skimmer is a forward skimmer for skimming the surface of the water and the second skimmer is an aft skimmer positioned to skim water in said holding area between said skimmers, said second skimmer having an area facing said holding area which is substantially smaller than the area of said first skimmer facing said holding area; and in which said forward skimmer is hinged to the bottom of said hull and has flotation material therein thereby acting as a floating weir; and wherein said hull has a forward opening and in which said forward skimmer is adapted to swing forward to partially block said forward opening when said boat means is in the traveling mode.

7. A skimming device in accordance with claim 1, in which said hull has a second propellor connected to said power source and said skimming means includes two tunnels, each having one of said positioned therein for drawing water therethrough.

8. A skimming device in accordance with claim 1, in which said skimming means further includes at least two skimmers spaced apart from each other with a holding area in between and wherein said first skimmer is a forward skimmer for skimming the surface of the water and the second skimmer is an aft skimmer positioned to skim water in said holding area between said skimmers, said second skimmer having an area facing said holding area which is substantially smaller than the area of said first skimmer facing said holding area.

9. A skimming device in accordance with claim 8, in which said tunnel is connected at one end to said holding area below the normal level of the surface of liquid in said holding area and extending through the bottom portion of said hull to the rear end portion of said hull.

10. A skimming device in accordance with claim 8, in which said forward skimmer is hinged to the bottom of said hull and has flotation material therein thereby acting as a floating weir.

11. A skimming device in accordance with claim 8, in which said skimming means includes a second aft skimmer, each of said aft skimmers positioned to skim liquid in said holding area.

12. A skimming device in accordance with claim 11, in which each of said aft skimmers is connected to skim the surface of the liquid in said holding area as a separate oil/water separator on said hull.

13. A skimming device in accordance with claim 1, in which said second tank has a water overflow pipe extending from the bottom portion thereof to a level approximately the same position as said oil outlet and has a siphon break therein.

14. A skimming device in accordance with claim 1, in which said skimming means includes draw means for drawing water through said propellor, said draw means including a prop, a swinging gate and a drive shaft, said prop connected by said drive shaft to said power source and said drive shaft having at least one universal joint.

15. A skimming vessel in accordance with claim 14, in which said tunnel extends from said skimming means to the back of said hull and said gate is positioned to open and close said tunnel and in which said drive shaft has a second universal joint therein and said prop is shifted by shift means with said gate for opening or closing said tunnel simultaneously with the raising and lowering of said prop.

16. A skimming vessel in accordance with claim 15, in which said shift means includes a hydraulic cylinder attached to said gate for raising or lowering said propellor prop and said gate simultaneously.

17. An oil/water separator comprising in combination:

a housing forming a pair of tanks connected by a passageway arranged between the top and bottom of said tanks;

an oil/water mixture inlet in one tank of said housing;

check valve means mounted between said one tank and said passageway between said tanks to prevent said oil/water mixture from flowing back to said one tank from said passageway and said check valve means includes a pair of check valves mounted one above the other;

a plurality of baffles mounted in predetermined positions in said passageway between said tanks, said baffles being mounted at an angle leaving a space above and below each of said baffles in said passageway between said tanks to permit fluid to flow about both the upper and lower ends of said baffles and therebetween and aid in separating oil from the water;

an oil outlet from the top portion of said other tank; and a water outlet from the top portion of said other tank, whereby an oil/water mixture fed into said one tank begins separating in said one tank and through a series of baffles dividing the oil from the water in said passageway for separate removal from said other tank.

18. An oil/water separator in accordance with claim 17, in which said oil/water mixture inlet includes a funnel shaped inlet having a pipe inlet feeding therein which directs said mixture into said one tank.

19. An oil/water separator in accordance with claim 17, in which said water outlet from said other tank includes a pipe extending from the bottom portion of said other tank to a level approximately the same as said oil outlet and has a vent pipe to form a siphon break, whereby said oil and water are discharged with overflow pipes.

* * * * *